United States Patent [19]

Kikkawa

[11] Patent Number: 4,694,926
[45] Date of Patent: Sep. 22, 1987

[54] VEHICLE STEERING SYSTEM

[75] Inventor: Masatoshi Kikkawa, Zama, Japan

[73] Assignee: Nissan Motor Co., Ltd., Japan

[21] Appl. No.: 903,966

[22] Filed: Sep. 5, 1986

[30] Foreign Application Priority Data

Sep. 6, 1985 [JP] Japan ................... 60-197173

[51] Int. Cl.$^4$ ............................... B62D 5/10
[52] U.S. Cl. .................... 180/132; 180/140; 180/156
[58] Field of Search ............... 180/140, 154, 155, 156, 180/157, 159, 132

[56] References Cited

FOREIGN PATENT DOCUMENTS 58-214470 12/1983 Japan ..................... 180/140
59-186774 10/1984 Japan .

Primary Examiner—John A. Pekar
Attorney, Agent, or Firm—Leydig, Voit & Mayer

[57] ABSTRACT

A hydraulic actuator for a vehicle steering system is provided with a biasing unit for holding an actuator rod at its neutral position. The biasing unit includes an annular resilient bushing whose longitudinally separated half is compressed while the remaining half is stretched by a pushing pin upon displacement of the actuator rod out of the neutral position.

7 Claims, 7 Drawing Figures

VEHICLE STEERING SYSTEM

BACKGROUND OF THE INVENTION

1. Field of the Invention

The present invention relates in general to a steering system for a vehicle and more particularly to a fluid actuator for a vehicle steering system for turning a first pair of steerable road wheels in response to turning of a second pair of steerable road wheels.

2. Description of the Prior Art

It is a known technique to turn a pair of rear steerable wheels in the same direction and by the same angle as a pair of front steerable wheels during high-speed cornering of a vehicle and hold the rear wheels at their neutral positions during straight-ahead travelling of the vehicle. An example of this kind of technique is disclosed in the Japanese Provisional Patent Publication No. 59-186,774. In the steering system of this publication, a power source of a power-assisted steering is utilized to actuate a hydraulic actuator having a piston rod operatively connected to a pair of rear steerable wheels. A pair of return springs are installed on the opposite end portions of the piston rod to urge the same toward its neutral position so that the piston rod returns to its neutral position when there is no supply of hydraulic pressure to the actuator.

A disadvantage of the above described steering system is that the return springs are required to have an excessively large spring constant so that they can prevail over lateral forces acting on the vehicle body and hold the rear wheels at their neutral positions, i.e., adjust and maintain the turning angle of the rear wheels to zero when there is no supply of hydraulic pressure to the actuator. This results in a large size actuator requiring a large space for installation.

SUMMARY OF THE INVENTION

In accordance with the present invention, there is provided a novel and improved hydraulic actuator for a vehicle steering system which comprises a housing having a cylinder, a piston positioned to move in the cylinder and define on the opposite sides thereof a pair of hydraulic chambers for selective communication with a source of hydraulic fluid under pressure, an actuator rod connected to the piston to move together therewith and extending externally of the housing, and biasing means for holding the actuator rod in a predetermined position when hydraulic fluid in the chambers are substantially equal to each other, wherein the biasing means includes a pushing pin secured to one of the actuator rod and the housing and an annular resilient bushing secured to the other of the actuator rod and the housing in such a manner that displacement of the actuator rod out of the predetermined position causes the pushing pin to compress a longitudinally separated half of the bushing while strecthing the remaining half of same.

The above structure is quite effective for overcoming the above noted disadvantages and shortcomings inherent in the prior art system.

It is accordingly an object of the present invention to provide a novel and improved vehicle steering system which is compact in structure and reliable in operation.

It is a further object of the present invention to provide a novel and improved vehicle steering system of the above described character which is practical and useful though simple in structure.

DETAILED DESCRIPTION OF THE PREFERRED EMBODIMENTS

Figure 1:
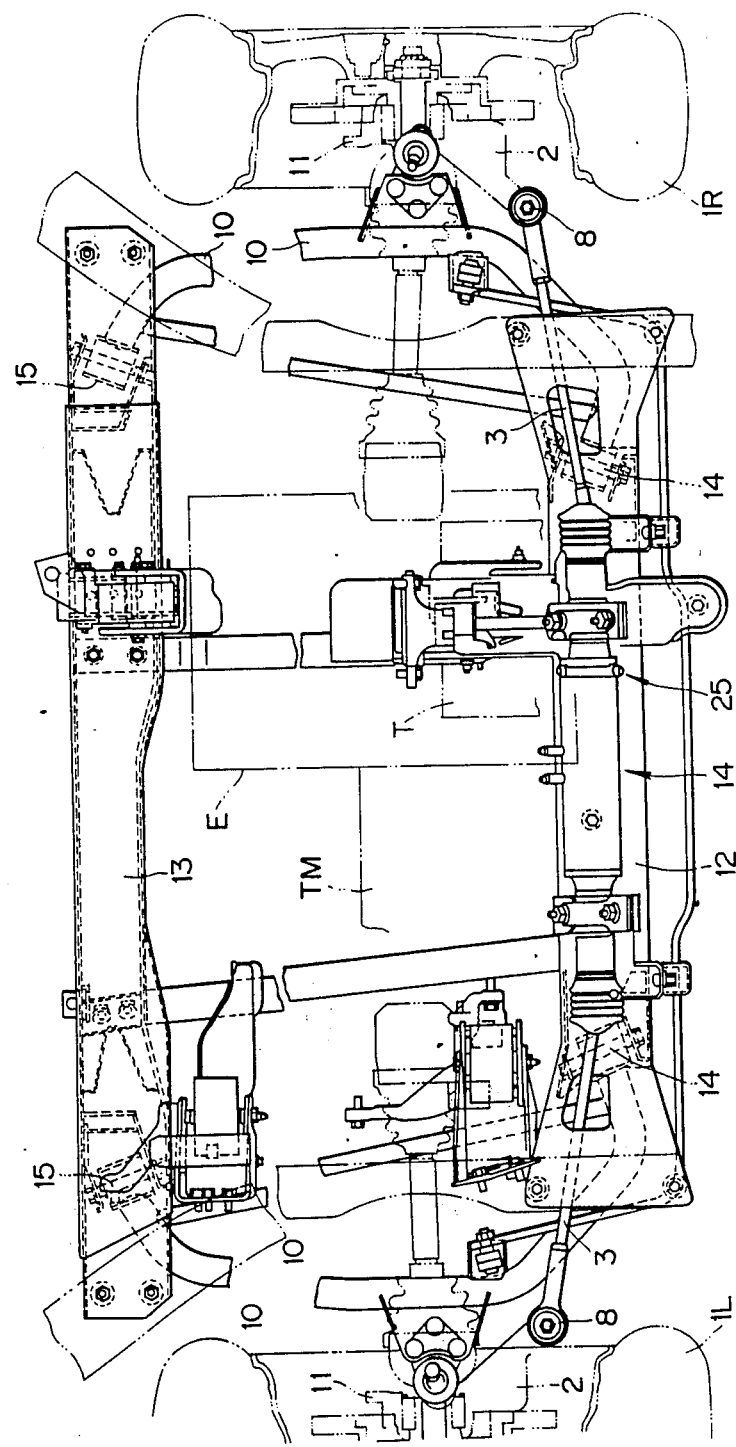
FIG. 1 is a plan view of a rearward part of a vehicle chassis incorporating a steering system of the present invention.
Figure 2:
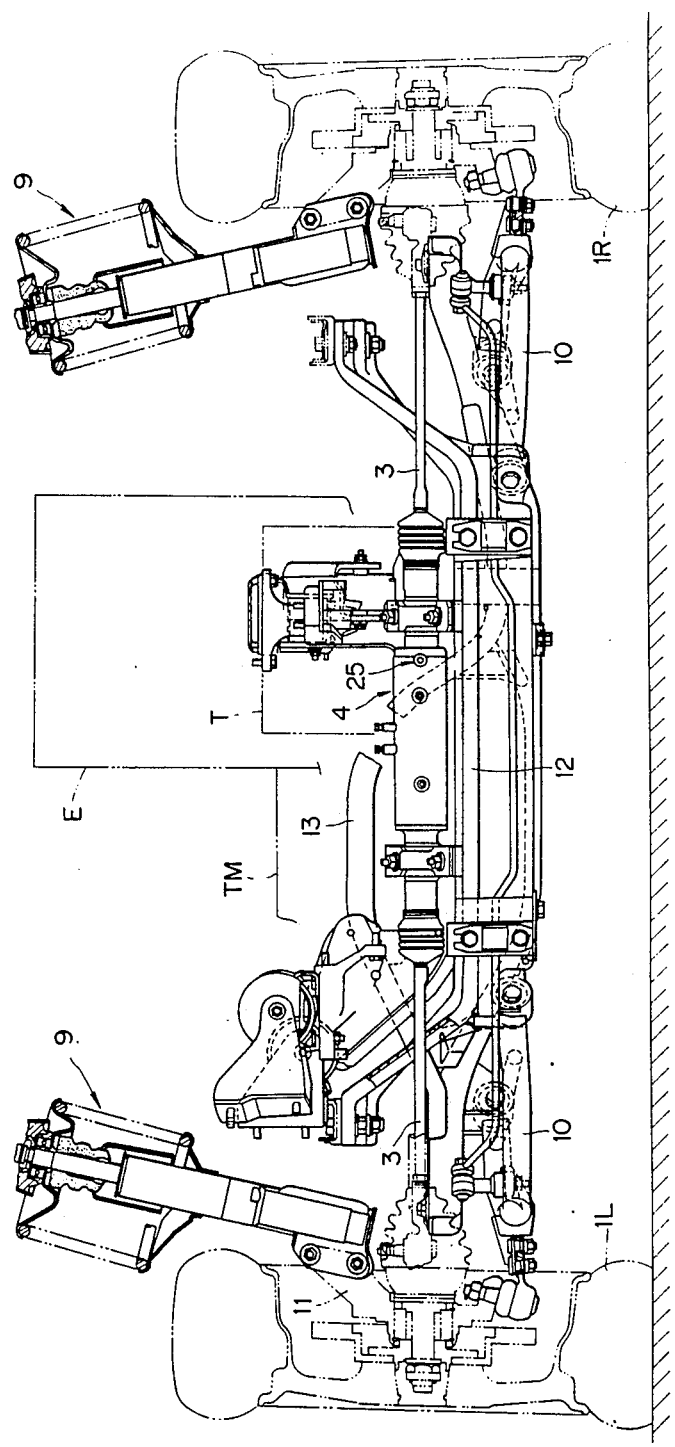
FIG. 2 is a rear elevational view of the vehicle chassis of FIG. 1.
Figure 3:
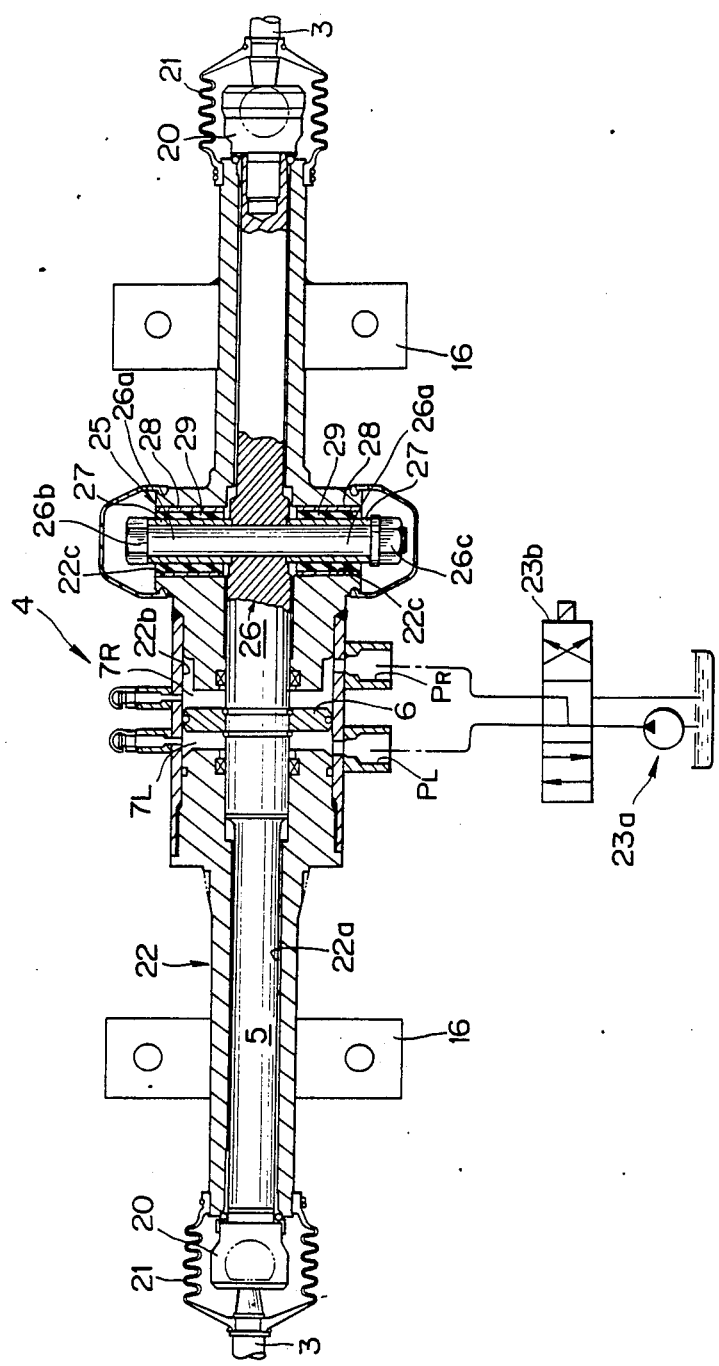
FIG. 3 is an enlarged sectional view of a hydraulic actuator employed in the steering system of FIGS. 1 and 2.
Figure 4:
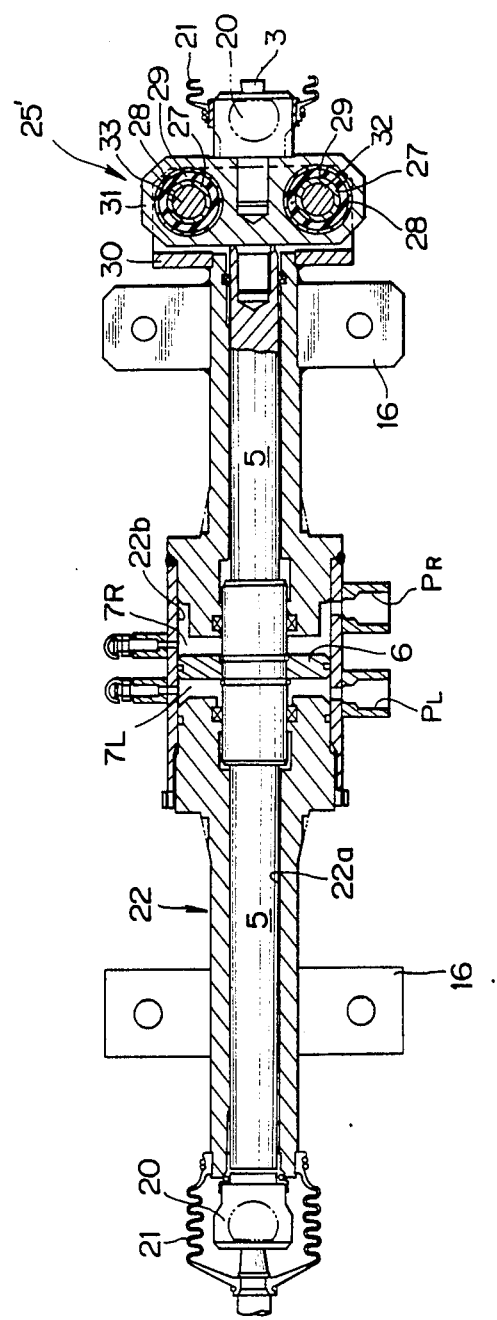
FIG. 4 is a view similar to FIG. 3 but showing a modification of the present invention.
Figure 5C:
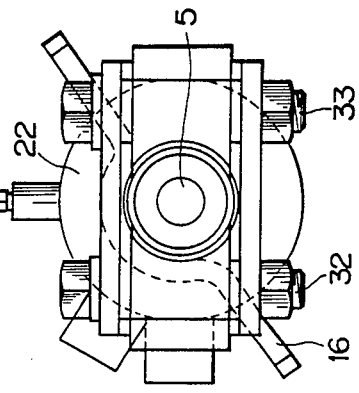
FIGS. 5A to 5C are views showing principal important portions of the hydraulic actuator of FIG. 4.
Figure 5A:
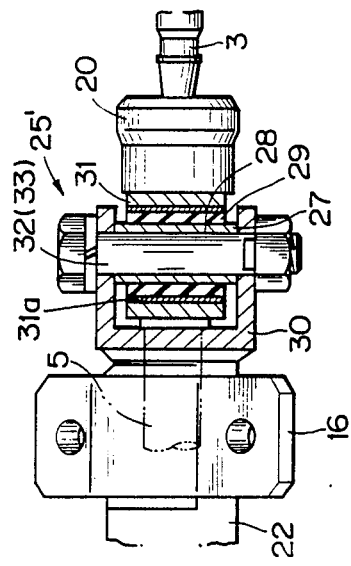
Figure 5B:
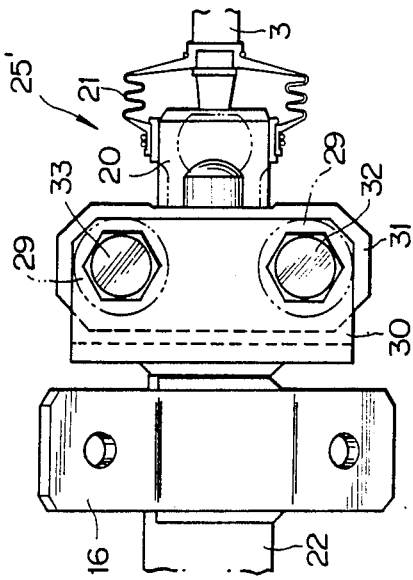

Referring to the drawings in which like reference numerals designate like parts throughout the several views thereof, there is shown in FIGS. 1 and 2 a rearward part of a vehicle chassis in which a steering system of this invention is incorporated. The steering system includes a pair of rear steerable wheel 1L, 1R which are respectively connected through knuckle arms 2, 2 and side rods 3, 3 to hydraulic actuator 4. Referring additionally to FIG. 3, actuator 4 includes piston rod or actuator rod 5 positioned to slide in a bore 22a of housing 22 and to extend externally of housing 22. Piston 6 is installed on or rigidly connected to actuator rod 5 in the region of piston cylinder 22b of housing 22 so that a pair of hydraulic chambers 7L, 7R are defined on the oppoosite sides of piston 6. Hydraulic chambers 7L, 7R are fluidly connected to fluid ports $P_L$, $P_R$ which are in turn connected to a source of hydraulic fluid under pressure 23a in order to introduce hydraulic fluid into chambers 7L, 7R under the control of servo valve or control valve 23b. For example, when hydraulic fluid is introduced through fluid port $P_L$ into hydraulic chamber 7L, piston 6 is urged rightward in the drawing. Rightward movement of piston 6 out of its neutral position causes rear wheels 1L, 1R to turn leftward. In this case, fluid port $P_R$ serves as discharge port. On the other hand, when hydraulic fluid is introduced through fluid port $P_R$ into hydraulic chamber 7R, piston 6 is urged leftward in the drawing. Leftward movement of piston 6 out of its neutral position causes rear wheels 1L, 1R to turn rightward. Hydraulic fluid source 23a may not be for exclusive use in steering of rear wheels 1L, 1R but the power source of a power-assisted steering may be used to this end. Knuckle arms 2, 2 and side rods 3, 3 are interconnected by way of ball joints 8, 8 so that reciprocation of side rods 3, 3 is converted into turning of rear wheels 1L, 1R.

Rear suspension structs 9, 9 are supported by suspension members 10, 10 called A-arms. A-arms 10, 10 also support rear axle carriers 11, 11. Indicated respectively by 12, 13 are rearward and forward cross members constituting part of rear suspension. A-arms 10, 10 are attached at their opposite ends to the lower sides of rearward and forward cross members 12, 13 by way of pivots 14, 15 so that the intermediate portions of A-arms 10, 10 can swing about their ends. Swinging of A-arms 10, 10 is damped by struts 9, 9. In addition to the above, rearward and forward cross members 12, 13 are adapted to carry a power unit consisting of engine main body E, transmission TM, transfer T, etc.

Hydraulic actuator 4 is installed on the upper side of rearward cross member 12. The opposite ends of actuator rod 5 extending externally of housing 22 are respectively connected to side rods 3, 3 by way of ball joints 20, 20. Boots 21, 21 are positioned to cover ball joints 20, 20 in a fluid-tight manner. Housing 22, within which actuator rod 5 is positioned to reciprocate leftwardly and rightwardly in the drawing, is fixedly attached to the upper side of rearward cross member 12 by means of a plurality of brackets 16, 16.

At a place adjacent piston 6, actuator 4 is provided with biasing unit for urging actuator rod 5 toward its neutral position and holding same thereat when the difference in hydraulic pressure between chambers 7L, 7R is lower than a predetermined value. When actuator rod 5 is held in its neutral position, the turning angle or rear wheels 1L, 1R is held zero. Biasing unit 25 is shown in FIG. 3 as including a transverse pushing pin 26 integrally or rigidily connected to actuator rod 5. Housing 22 has a pair of accomodation holes 22c, 22c allowing pushing pin 26 to extend therethrough. Biasing unit 25 further includes a pair of inner collars 28 fittingly installed on pushing pin 26, a pair of outer collars 28 fittingly installed in accommodation holes 22c, 22c of housing 22, and a pair of rubber-like resilient members or bushings 29, 29 interposed between inner and outer collars 27, 28. More specifically, pushing pin 26 is installed in such a manner as to extend across the axis of actuator rod 5 at right angles and to have a pair of pin sections 26a, 26a extending externally of actuator rod 5 in the opposite directions. While pushing pin 26 is shown as a bolt-like independent member fittingly installed in actuator rod 5 by caulking, force-fit or the like, it may be moulded integrally with actuator rod 5. Inner collars 27, 27 are fittingly installed on respective pin sections 26a, 26a by force-fit or the like, while outer collars 28, 28 are fittingly inserted into accommodation holes 22c, 22c by force-fit or the like. The inner diameter of outer collars 28, 28 are larger than the outer diameter of inner collars 27, 27 so that tubular or annular elastic bushings 29, 29 are placed between inner and outer collars 27, 28. Inner and outer collars 27, 28 and bushings 29 may be preassembled prior to installation on actuator rod 5 and housing 22 so as to constitute two subassemblies which are then installed on pushing pin sections 26a, 26a and at the same time inserted into accommodation holes 22c, 22c of housing 22. In this instance, it is important that the joining surfaces of the three parts—inner and outer collars 27, 28 and bushings 26—are fixedly attached to each other by bonding or the like so that the joining surfaces of the three parts are prevented from sliding relative to each other when pushing pin 26 moves together with actuator rod 5. As seen from FIG. 3, pushing pin 26 has bolt head 26b and nut 26c and cooperates with actuator rod 5 to clamp therebetween inner collars 27, 27 so that biasing unit 25 is held axially in place.

In the foregoing, it is to be understood that the same effect as above can be obtained even when only bushings 29, 29 are installed on pushing pin sections 26a, 26a to interconnect the outer circumferential walls of pushing pin sections 26a, 26a and the inner circumferential walls of accommodation holes 22c, 22c in order to dispense with inner and outer collars 27, 28.

Referring to FIGS. 4 and 5A–5C, a modified embodiment will now be described. This embodiment differs from the previous embodiment primarily in that biasing unit 25' is installed on an end of actuator rod 5 and the adjacent end of housing 22. To this end, stationary bracket 30 of a channel-like section is secured to the above mentioned end of housing 22. Movable bracket 31 is interposed between an end of actuator rod 5 and ball joint 20 to interconnect the same and is movably received in stationary bracket 30. Movable bracket 31 is movably connected to stationary bracket 30 by a pair of parallel pushing pins or bolts 32, 33 extending perpendicularly to a plane including the axis of actuator rod 5 and spaced away from the axis of actuator rod 5 in the opposite directions. Bolts 32, 33 are secured at their opposite ends to bracket 30 so as to be stationary relative thereto. Bracket 31 is limitedly movable relative to bolts 32, 33. Subassemblies consisting of inner and outer collars 27, 28 and bushings 29 are respectively installed on bolts 32, 33 to interconnect stationary and movable brackets 30, 31. To this end, movable bracket 31 is formed with a pair of accommodation holes 31a, 31a allowing bolts 32, 33 to extend therethrough. Outer collars 28, 28 are fitted in accommodation holes 31a, 31a.

In operation of the foregoing two embodiments, when hydraulic fluid under pressure is supplied from fluid source 23a to hydraulic chamber 7L to apply a driving force upon piston 6 in response to the control of servo valve 23b which is actuated by an electronic control unit (not shown), causing piston 6 to move rightwardly in the drawing together with actuated rod 5. Rightward movement of actuator rod 5 causes pushing pin 26 or movable bracket 31 to move in the same direction, compressing the rightward halves of bushings 29, 29 while stretching the leftward halves of same. When the steering wheel is returned to its neutral position, hydraulic fluid under pressure is supplied equally to both chambers 7L, 7R so as not to apply any driving force upon piston 6. Actuator rod 5 is thus returned to its neutral position under the bias of bushings 29, 29. In this connection, it is to be noted that the amount of actual displacement of actuator rod 5 is quite small, for example, 1 mm or less.

From the foregoing, it is to be understood that bushings 29, 29 employed in the steering system of this invention can be much more compact than the return springs employed in the prior art system, thus making it possible to make the actuator and therefore the entire of the steering system than those of the prior art.

It is further to be understood that the steering system of this invention is suited for use in midship cars in which a larger weight is distributed to rear wheels. However, the present invention is also applicable to a power steering for steering front wheels.

What is claimed is:

1. A hydraulic actuator for a vehicle steering system, comprising:
    a housing having a cylinder;
    a piston positioned to move in said cylinder and define on the opposite sides thereof a pair of hydraulic chambers for selective communication with a source of hydraulic fluid under pressure;
    an actuator rod connected to said piston to move together therewith and extending externally of said housing; and
    biasing means for holding said actuator rod in a predetermined position when hydraulic fluid pressures in said chambers are substantially equal to each other;
    said biasing means including a cylindrical pushing pin secured to one of said actuator rod and said housing and an annular resilient bushing surrounding a longitudinal portion of said pin and secured to the other of said actuator rod and said housing in such a manner that displacement of said actuator rod out of said predetermined position causes said pushing pin to compress a longitudinally separated half of said bushing while stretching the remaining longitudinally separated half of said bushing.

2. A hydraulic actuator as set forth in claim 1 wherein said pushing pin is positioned adjacent said piston and fittingly installed on said actuator rod in such a manner as to extend across the axis of said actuator rod and to have a pair of pin sections extending externally of said housing in the opposite directions, said housing having a pair of accommodation holes allowing said pin sections to extend therethrough, said biasing means further including a pair of inner collars fittingly installed on said pin sections, a pair of outer collars fittingly installed in said accommodation holes and two of said bushings interposed between said inner and outer collars.

3. A hydraulic actuator as set forth in claim 2 wherein said bushings have inner and outer circumferential walls bonded to corresponding walls of said inner and outer collars.

4. A hydraulic actuator as set forth in claim 1 wherein said biasing means further includes a stationary bracket having a channel-like section and secured to an end of said housing, and a movable bracket secured to an end of said actuator rod and movably received in said housing, said pushing pin extending perpendicularly to a plane including the axis of said actuator rod and being secured at its opposite ends to said stationary bracket while movably connecting said movable bracket to said stationary bracket.

5. A hydraulic actuator as set forth in claim 4 wherein said biasing means further includes two of said pushing pins spaced away from the axis of said actuator rod in the opposite directions, said movable bracket having a pair of accommodation holes allowing said pushing pins to extend therethrough, a pair of inner collars fittingly installed on said pushing pins, a pair of outer collars fittingly installed in said accommodation holes, and two of said bushings interposed between said inner and outer collars.

6. A hydraulic actuator as set forth in claim 5 wherein said bushings have inner and outer circumferential walls bonded to corresponding walls of said inner and outer collars.

7. A hydraulic actuator as set forth in claim 1 wherein said actuator rod is connected at its opposite ends to a pair of steerable road wheels by way of a pair of side rods and a pair of knuckle arms.

* * * * *